United States Patent
Knittel et al.

(10) Patent No.: US 8,023,395 B2
(45) Date of Patent: Sep. 20, 2011

(54) OPTICAL STORAGE MEDIUM COMPRISING TRACKS WITH POSITIVE AND NEGATIVE MARKS, AND STAMPERS AND PRODUCTION METHODS FOR MANUFACTURING OF THE OPTICAL STORAGE MEDIUM

(75) Inventors: Joachim Knittel, Tuttlingen (DE); Stephan Knappmann, Zimmern OB Rottweil (DE)

(73) Assignee: Thomson Licensing, Princeton, NJ (US)

( * ) Notice: Subject to any disclaimer, the term of this patent is extended or adjusted under 35 U.S.C. 154(b) by 264 days.

(21) Appl. No.: 12/311,714

(22) PCT Filed: Oct. 11, 2007

(86) PCT No.: PCT/EP2007/060826
§ 371 (c)(1),
(2), (4) Date: Apr. 9, 2009

(87) PCT Pub. No.: WO2008/046777
PCT Pub. Date: Apr. 24, 2008

(65) Prior Publication Data
US 2010/0195476 A1    Aug. 5, 2010

(30) Foreign Application Priority Data

Oct. 16, 2006  (EP) ..................................... 06122316
Nov. 13, 2006  (EP) ..................................... 06123931

(51) Int. Cl.
*G11B 7/24* (2006.01)
(52) U.S. Cl. .................. 369/275.3; 369/13.33; 369/111
(58) Field of Classification Search ............... 369/13.33, 369/111, 275.3; 264/1.33
See application file for complete search history.

(56) References Cited

U.S. PATENT DOCUMENTS 4,430,401 A  *  2/1984  Wilkinson ..................... 430/8

(Continued)

FOREIGN PATENT DOCUMENTS

EP        1202256         5/2002

(Continued)

OTHER PUBLICATIONS

Search Report Dated Jan. 14, 2008.

*Primary Examiner* — Wayne Young
*Assistant Examiner* — Brenda Bernardi
(74) *Attorney, Agent, or Firm* — Tutunjian & Bitetto, P.C.

(57) ABSTRACT

The optical storage medium comprises a substrate layer, a data layer with a mark/space structure arranged in tracks on the substrate layer, and a cover layer. One track comprises positive marks and a neighboring track comprises negative marks. The tracks are arranged in particular as spirals wherein one spiral contains a track with only positive marks and a neighboring spiral contains a track with only negative marks. The positive marks of a track and correspondingly the negative marks of a track are separated each by spaces. The optical storage medium is particularly a read-only optical disc and comprises a mask layer with a super resolution near field structure, wherein the tracks of the data layer are arranged as two spirals, one spiral consisting of positive marks only and the other spiral consisting of negative marks only. For the production of the optical storage medium, a stamper and production methods for a master for a stamper production are provided, comprising a surface with positive and negative marks, which correspond to the respective positive and negative marks of the data layer of the optical storage medium.

11 Claims, 4 Drawing Sheets

U.S. PATENT DOCUMENTS

| | | | |
|---|---|---|---|
| 5,553,051 A | 9/1996 | Sugiyama et al. | |
| 5,594,716 A | 1/1997 | Inoue | |
| 6,440,333 B2* | 8/2002 | Masuhara | 264/1.33 |
| 6,570,840 B1* | 5/2003 | Wilkinson et al. | 369/275.4 |
| 6,706,358 B1* | 3/2004 | McDaniel et al. | 428/64.1 |
| 6,800,348 B2* | 10/2004 | Takemoto et al. | 428/64.4 |
| 7,102,986 B2* | 9/2006 | Moribe et al. | 369/275.3 |
| 2002/0054561 A1 | 5/2002 | Inase et al. | |
| 2003/0002416 A1 | 1/2003 | Furumiya et al. | |
| 2003/0214901 A1* | 11/2003 | Koyama et al. | 369/275.4 |
| 2005/0243697 A1* | 11/2005 | Shioura et al. | 369/275.4 |
| 2005/0287397 A1* | 12/2005 | Soeno et al. | 428/831 |
| 2006/0183004 A1* | 8/2006 | Hattori et al. | 428/833.1 |
| 2007/0120292 A1* | 5/2007 | Hattori et al. | 264/293 |

FOREIGN PATENT DOCUMENTS

EP  1 308 939 A1  5/2003

* cited by examiner

US 8,023,395 B2

OPTICAL STORAGE MEDIUM COMPRISING TRACKS WITH POSITIVE AND NEGATIVE MARKS, AND STAMPERS AND PRODUCTION METHODS FOR MANUFACTURING OF THE OPTICAL STORAGE MEDIUM

This application claims the benefit, under 35 U.S.C. §365 of International Application PCT/EP2007/060826, filed Oct. 11, 2007, which was published in accordance with PCT Article 21(2) on Apr. 24, 2008 in English and which claims the benefit of European patent application No. 06122316.0, filed Oct. 16, 2006 and European patent application No. 06123931.5, filed Nov. 13, 2006.

TECHNICAL FIELD OF THE INVENTION

The present invention relates to an optical storage medium, which comprises a substrate layer, a read-only data layer with a mark/space structure arranged in tracks on the substrate layer and a cover layer, and to a respective production of the optical storage medium. The optical storage medium comprises in particular also a mask layer with a super resolution near field structure for storing of data with a high data density.

BACKGROUND OF THE INVENTION

Optical storage media are media in which data are stored in an optically readable manner, for example by means of a pickup comprising a laser for illuminating the optical storage medium and a photo-detector for detecting the reflected light of the laser beam when reading the data. In the meanwhile a large variety of optical storage media are available, which are operated with different laser wavelength, and which have different sizes for providing storage capacities from below one Gigabyte up to 50 Gigabyte (GB). The formats include read-only formats (ROM) such as Audio CD and Video DVD, write-once optical media as well as rewritable formats. Digital data are stored on these media along tracks in one or more layers of the media.

The storage medium with the highest data capacity is at present the Blu-Ray disc (BD), which allows to store 50 GB on a dual layer disc. Available formats are at present for example read-only BD-ROM, re-writable BD-RE and write once BD-R discs. For reading and writing of a Blu-Ray disc an optical pickup with a laser wavelength of 405 nm is used.

On the Blu-Ray disc a track pitch of 320 nm and a mark length from 2 T to 8 T, maximum 9 T, is used, where T is the channel bit length, which corresponds with a length of 69-80 nm. Further information about the Blu-Ray disc system is available for example from the Blu-Ray group via Internet: www.blu-raydisc.com.

New optical storage media with a super-resolution near-field structure (Super-RENS) offer the possibility to increase the data density of the optical storage medium by a factor of three to four in one dimension in comparison with the Blu-Ray disc. This is possible by using a so-called Super-RENS structure or layer, which is placed above the data layer of the optical storage medium, and which significantly reduces the effective size of a light spot used for reading from or writing to the optical storage medium. The super-resolution layer is also called a mask layer because it is arranged above the data layer and by using specific materials only the high intensity center part of a laser beam can penetrate the mask layer.

The Super-RENS effect allows to record and read data stored in marks of an optical disc, which have a size below the resolution limit of a laser beam used for reading or writing the data on the disc. As known, the diffraction limit of the resolution of a laser beam is about lambda/(2*NA) according to Abbe, where lambda is the wavelength and NA the numerical aperture of the objective lens of the optical pickup.

A Super-RENS optical disc comprising a super-resolution near-field structure formed of a metal oxide or a polymer compound for recording of data and a phase change layer formed of a GeSbTe or a AgInSbTe based structure for reproducing of data is known from WO 2005/081242 and US 2004/0257968. Further examples of super-resolution optical media are described in WO 2004/032123 and by Tominaga et al., Appl. Phys. Lett. Vol. 73, No. 15, 12 Oct. 1998.

The super RENS effect allows to increase the resolution of the optical pickup for reading of the marks on an optical disc in track direction, but does not allow to reduce the track pitch.

SUMMARY OF THE INVENTION

The optical storage medium comprises a substrate layer, a cover layer and a data layer with a mark/space structure arranged in tracks. One track comprises positive marks and a neighboring track comprises negative marks. The tracks are arranged in particular as spirals wherein one spiral contains a track with only positive marks and a neighboring spiral contains a track with only negative marks. The positive marks of a track and correspondingly the negative marks of a track are separated each by spaces.

A positive mark corresponds for example with a bump and a negative mark with a pit. The mark structure between neighboring tracks is hence alternating, and the effective period of the track pitch is therefore doubled. When using an optical pick-up for reading of the data, the pick-up can focus either on tracks having positive marks, or on tracks having negative marks. The track pitch of the optical storage medium can be reduced therefore by about a factor of two for a respective pick-up, without changing the design of the pick-up. When using a Blu-Ray type pick-up, the track pitch between two neighboring tracks can be reduced therefore below its optical resolution limit of 280 nm, for example to a value within a range of 150-250 nm.

In a further aspect of the invention, the optical storage medium is a read-only optical disc and comprises a mask layer with a super resolution near field structure, wherein the tracks of the data layer are arranged as two spirals, one spiral consisting of positive marks only and the other spiral consisting of negative marks only, and wherein the distance from one spiral to the other spiral is below the optical resolution limit of a corresponding pick-up unit.

For the production of the optical storage medium, a stamper is provided, which comprises a surface with positive and negative marks, which correspond to the respective positive and negative marks of the data layer of the optical storage medium. For the production of an optical disc having a data structure, in which the tracks are arranged in two spirals, one spiral consisting of positive marks only and the other spiral consisting of negative marks only, the stamper has a corresponding surface with two respective spirals for the production of the optical disc.

Such a stamper can be produced advantageously by producing first a glass master or a silicon master, on which first tracks are produced in an upper layer having positive marks, and in further steps tracks are produced in a lower layer having negative marks. A metal master for a stamper production can be produced by arranging negative marks in a metal substrate, and arranging positive marks in a layer above the metal substrate. With such a glass master or metal master a stamper can be produced in the usual way, having a track pitch between the two spirals in particular within a range of 150-250 nm.

BRIEF DESCRIPTION OF THE DRAWINGS

Preferred embodiments of the invention are explained now in more detail below by way of example with reference to schematic drawings, which show.

DETAILED DESCRIPTION OF PREFERRED EMBODIMENTS

Figure 1:
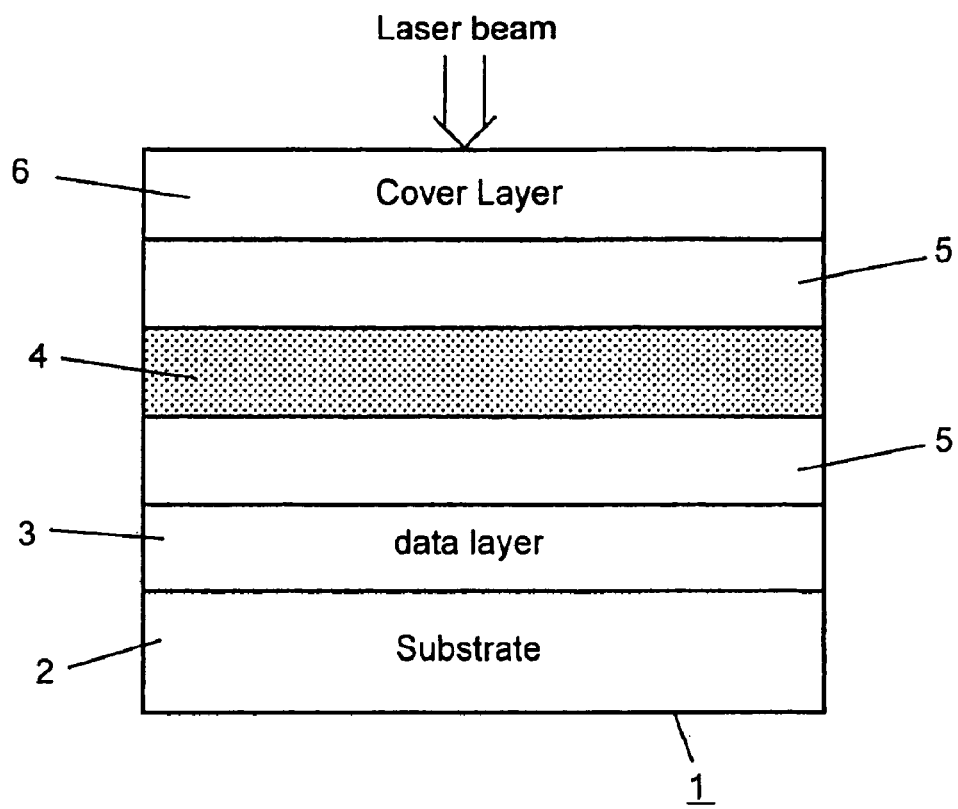
FIG. 1 a part of an optical storage medium in a cross section, showing a layer structure comprising a substrate, a data layer and layer with a super resolution near field structure, FIG. 2 the data layer of FIG. 1, having a mark/space structure with positive and negative marks, FIG. 3 a first method for producing a first non-metal master for a stamper production, FIG. 4 a second method for producing a second non-metal master for a stamper production and FIG. 5 a third method for producing a metal master for a stamper production.

In FIG. 1 a read-only optical storage medium 1 is shown in a cross section in a simplified manner. On a substrate 2 a read-only data layer 3 is arranged comprising a reflective metallic layer, for example an aluminum layer, data layer 3 having a data structure consisting of marks and spaces arranged on essentially parallel tracks. On the data layer 3 a first dielectric layer 5 is arranged and on the dielectric layer 5 a mask layer 4 is arranged for providing a super-resolution near-field effect (Super-RENS). The optical storage medium 1 is in particular an optical disc having a size similar to DVDs and CDs for example.

Above the mask layer 4 a second dielectric layer 5 is arranged. As a further layer, a cover layer 6 is arranged on the second dielectric layer 5 as a protective layer. For reading the data of the data layer, 3, a laser beam is applied from the top of the storage medium 1, penetrating first the cover layer 6. The first and second dielectric layers 5 comprise for example the material $ZnS-SiO_2$. The substrate 2 and the cover layer 6 may consist of a plastic material, as known from DVDs and CDs. In other embodiments, the reflective metallic layer may be omitted, when a super-resolution near field structure is used, which does not provide an increase in transmittance due to a heating effect, but works with another Super-RENS effect.

With the Super-RENS effect, the resolution of an optical pick-up can be increased in track direction by a considerable amount, for example by a factor of three or four. This allows a reduction the size of the marks and spaces of the tracks on the optical disc in track direction. But the Super-RENS effect as such does not allow to reduce the track pitch below the optical resolution limit of the pick-up unit. If a push-pull effect is used for the tracking regulation of the optical pick-up unit, the reduction of the track pitch is limited by the fact that the first order refracted beams have to be collected by the objective lens. Otherwise there is no push-pull signal, because this signal is generated by the interference of the $0^{th}$ order and the $1^{st}$ order beams as reflected from the optical storage medium. For a Blu-Ray pick-up this occurs at a track pitch of about 280 nm, the standard track pitch of a Blu-Ray disc is 320 nm.

Figure 2:
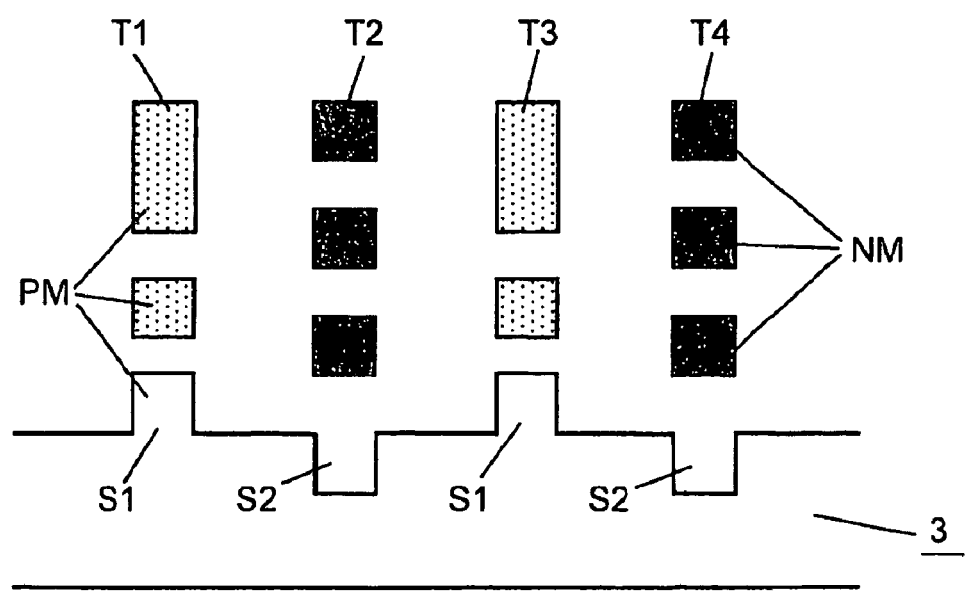

To overcome this problem, the pit structure of the data layer 3 is inverted for every second track, as shown in FIG. 2. The tracks T1-T4 comprise positive and negative marks, which are alternating from one track to the next track, such that a first track T1 comprises positive marks PM being consistent with or resembling bumps, and the neighboring second track T2 comprises negative marks NM being consistent with pits. The positive marks and the negative marks are representing always a logical "1" and the spaces between the marks a logical "0" of the data structure of the tracks T1-T4.

By using such a data structure with inverted pits for every neighboring track, the effective period of the track pitch is doubled, and therefore a push-pull signal can be seen, even when the track pitch is reduced by a factor of two between two neighboring tracks with regard to a conventional Blu-Ray ROM disc. A conventional Blu-Ray ROM disc may have either positive marks resembling pits or negative marks resembling bumps, but never a mixture of both bumps and pits for marks. For a Blu-Ray type disc, the track pitch can be reduced therefore up to about 160 nm, because the resolution limit is reduced from 280 nm to 140 nm.

The tracks T1-T4 of the optical storage medium as shown in FIGS. 1 and 2, which represent only a small section of the optical storage medium 1, are arranged in a preferred embodiment in particular as two spirals S1, S2, one spiral S1 consisting of positive marks PM and spaces only and the neighboring spiral S2 consisting of negative marks NM and spaces only.

For producing a ROM optical storage medium, in particular a disc, having a track structure as explained with regard to FIG. 2, a stamper is required, which comprises also tracks with a corresponding alternating reverted/non-inverted pit structure, but with pits and bumps being inverted with regard to the mark/space structure of the ROM storage medium to be produced: For producing pits at respective locations of a ROM disc, the surface of the stamper has to have a respective bump of the same size for the respective locations.

Figure 3:
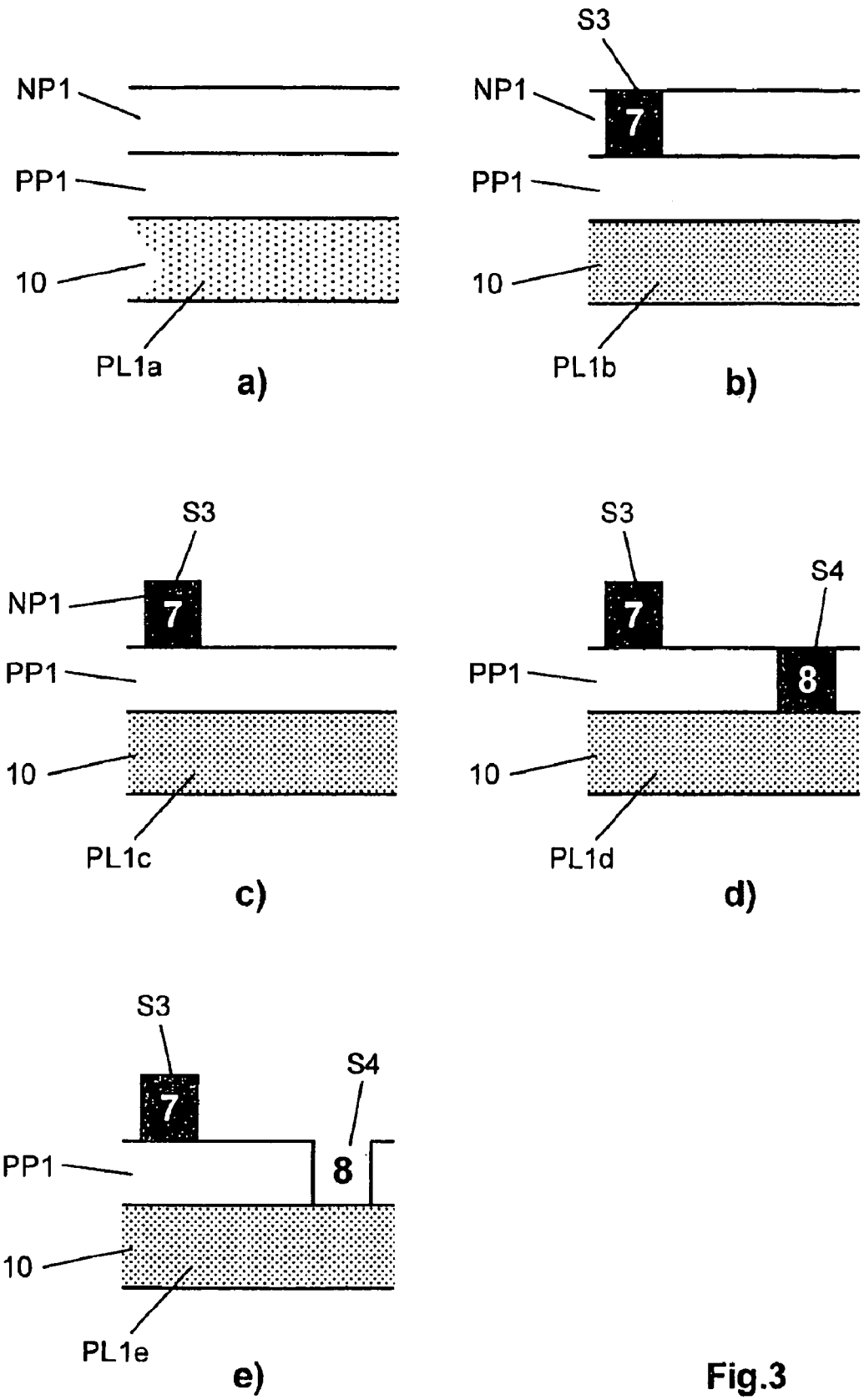

A first non-metal master for a stamper production for producing a ROM optical storage medium with a structured data layer as described with regard to FIG. 2 can be manufactured for example by using a first method, as explained with regard to FIG. 3. In FIG. 3a a part of a plate PL1a is shown in a cross section comprising a non-metal substrate 10, which is covered by a positive photoresist PP1, and which is covered by a negative photoresist NP1. The substrate 10 is for example a glass substrate or a silicon (Si), or a $SiO_2$ substrate. The photoresists PP1 and NP1 should have the following properties: A first, liquid solvent usable to remove the resist NP1 should not effect the resist PP1, and a second, liquid solvent usable to remove the resist PP1 should not effect the photoresist NP1.

In a first step, FIG. 3b, the negative photoresist NP1 is illuminated with a mastering machine for producing positive marks 7, which resemble in particular bumps PM, as shown in FIG. 2. After the illumination, the negative photoresist NP1 comprises a data structure for a first spiral S3, as indicated with the plate PL1b in FIG. 3b. In a next step, the first solvent is applied on the plate PL1b to remove the negative photoresist NP1 at non-exposed areas. As a result, a plate PL1c is obtained comprising a first spiral S3 consisting of positive marks with bumps 7 and spaces, as illustrated in FIG. 3c.

In a further step, FIG. 3d, the positive photoresist PP1 is illuminated with a mastering machine to produce negative marks resembling in particular pits NM, as shown in FIG. 2, for a second spiral S4. As a result, the layer with the positive photoresist PP1 comprises a data structure, as indicated in a simplified manner in FIG. 3d, plate PL1d. In a next step, the second solvent is applied to remove the positive photoresist PP1 at the exposed areas. As a result, a plate PL1e is obtained comprising a second spiral S4 with negative marks, respectively pits 8, as shown in FIG. 3e. The plate PL1e comprises now a data structure including two spirals S3, S4 for the production of a ROM disc in a known manner. The plate PL1e can be used for example as a stamper or for the production of a stamper, as known.

Figure 4:
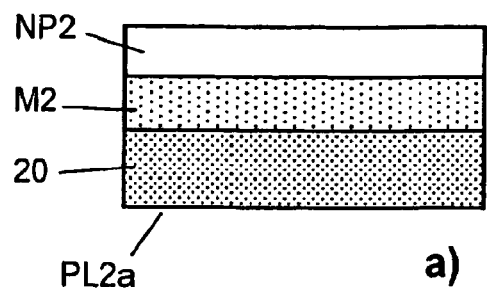
Figure 4:
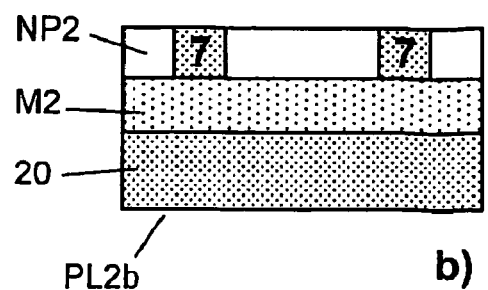
Figure 4:
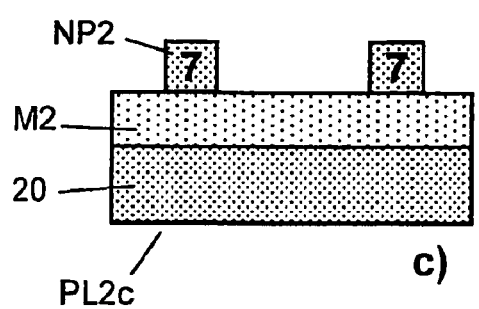
Figure 4:
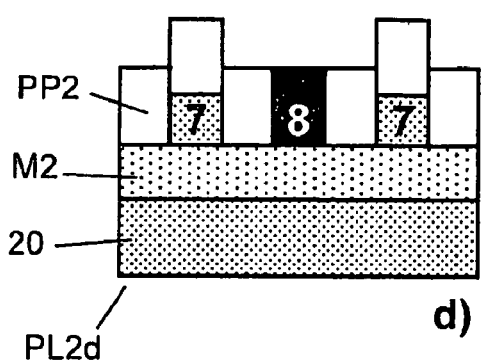
Figure 4:
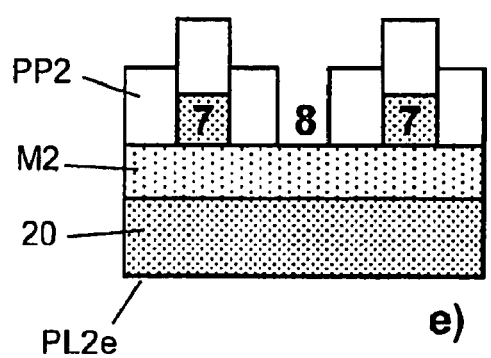
Figure 4:
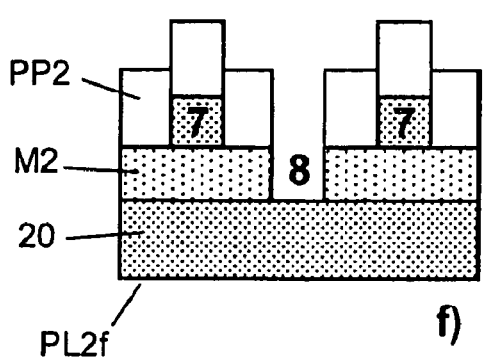
Figure 4:
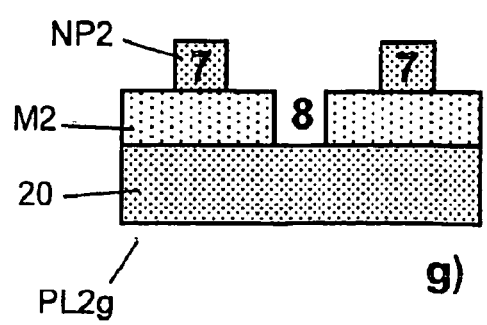

A second method for producing a second non-metal master for a stamper production for producing a ROM optical storage medium comprising a data structure in accordance with FIG. 2 is explained now with regard to FIG. 4. In FIG. 4a, a plate PL2a is shown comprising a substrate 20, which is covered by a material M2, which is not photosensitive, but solvable in a liquid solvent, referred to as fifth solvent. The substrate 20 is for example a glass substrate or a silicon (Si), or a SiO$_2$ substrate. The material M2 is covered by a negative photoresist NP2. In a first step, the plate PL2a with the negative photoresist
NP2 is illuminated with a mastering machine for producing positive marks 7, as shown in FIG. 4b. After the illumination, the third solvent is applied to remove the negative photoresist NP2 at non-exposed areas. The result is shown in FIG. 4c. The third solvent should not effect the material M2, which therefore still completely covers the glass substrate 20.

In a further step, the plate PL2c with the positive mark 7 as shown in FIG. 4c is coated with a positive photoresist PP2, to obtain a plate PL2d. Then the plate PL2d with the photoresist PP2 is illuminated with a mastering machine to produce tracks with negative marks 8 between the tracks with the positive marks 7, as shown in FIG. 4d. Then a fourth solvent is applied to remove the positive photoresist PP2 at the exposed areas. The result, plate PL2e, is shown in FIG. 4e.

Then an etching process is applied to remove the non-covered part of the material M2 by using a fifth solvent.

The fifth, etching solvent is selected such, that it does not affect the positive photoresist PP2. As a result, pits 8 are obtained in the material M2, giving plate PL2f, as shown in FIG. 4f. In a final step, a sixth solvent is used to remove the remaining parts of the positive photoresist PP2, and as a result, a glass master PL2g is obtained as shown in FIG. 4g, from which a stamper for a production of read-only optical storage media in accordance with FIG. 2 can be produced.

The positive marks 7 of the plate P12g, and correspondingly the negative marks 8, have a wide track pitch of about 300-500 nm, which allows in particular a tracking regulation for respective optical storage media by using a pick-up unit comprising a Blu-Ray system optics. The track pitch between tracks with negative pits 7 and positive pits 8 is then within a range of 150-250 nm, below the optical resolution limit of a Blu-Ray pick-up. By using a stamper produced with this method, therefore ROM discs comprising an increased data density of about a factor of two in radial dimension can be manufactured therefore.

The photoresists NP2, PP2 and the material M2 must have the following properties: The third solvent used to remove photoresist NP2 should not affect material M2. The fourth solvent used to remove the illuminated part of photoresist PP2 could partly resolve material M2. The fifth solvent used to etch material M2 should not affect photoresist PP2. The sixth solvent used to remove the non-illuminated part of photoresist PP2 should not effect substrate 20, material M2 and the positive marks 7 of photoresist NP2.

The advantage of this method in comparison with the method as described with regard to FIG. 3 is that more freedom is obtained for using different photoresists and different materials M2. Particularly, it is not required that the material M2 is photosensitive. For the material M2 and for the substrate 20 for example glass, SiO$_2$, or Si can be used. Further, it is in principle possible to leave out material M2. In this case the pits 8 are etched directly into the substrate 20.

Figure 5:
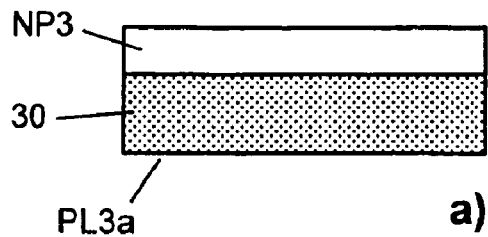
Figure 5:
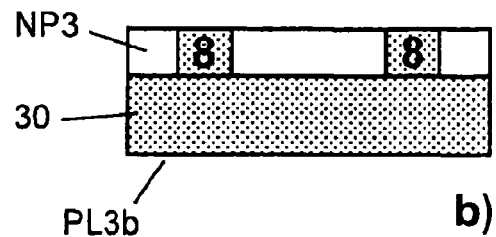
Figure 5:
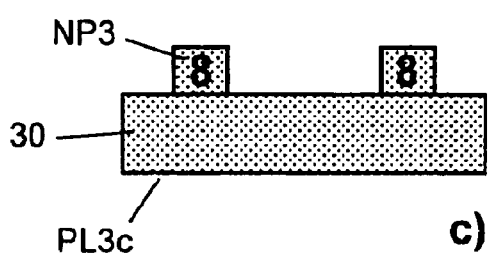
Figure 5:
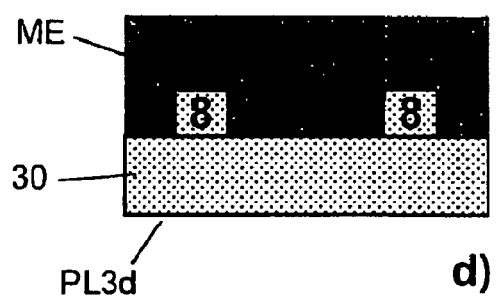
Figure 5:
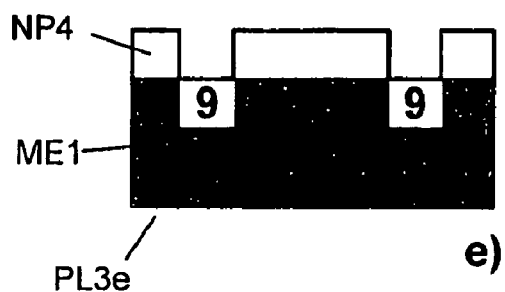
Figure 5:
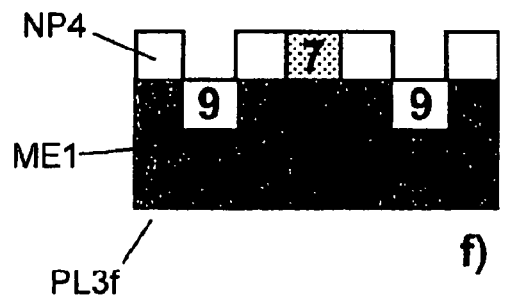
Figure 5:
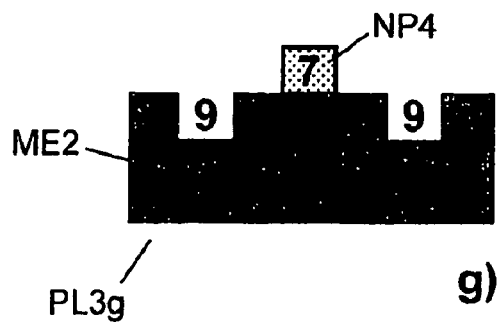

A method for producing a metal master for a stamper production for producing a ROM optical storage medium comprising a data structure in accordance with FIG. 2 is explained with regard to FIG. 5. With this method, also a spiral comprising positive pits and a neighboring spiral comprising negative pits are produced in several consecutive steps. The production of the master starts with a plate PL3a comprising a non-metal substrate 30, for example a glass substrate or a silicon (Si) or SiO$_2$ substrate, which is covered with a negative photoresist NP3. In a first step, the photoresist NP3 of the plate PL3a is illuminated with a mastering machine to produce positive marks 8, as shown in FIG. 5b. After the illumination, a seventh solvent is applied to remove the photoresist NP3 at non-exposed areas for producing the marks 8 resembling bumps, as shown in FIG. 5c. The track pitch between the positive marks 8 is for example within a range of 300 nm-500 nm.

Then a sputtering and electroplating method is used to make a metal master, for example a nickel master, by covering the plate PL3c with a metal ME, as shown in FIG. 5d, plate PL3d. Then in a next step the substrate 30 together with the remaining photoresist NP3 of the marks 8 is removed, by using the same principle as in conventional mastering. Then a metal substrate ME1 is obtained including negative marks 9, respectively pits 9, comprising pre-recorded information, which correspond with the positive marks 8 of plate PL3c.

The metal substrate ME1 is then used as a substrate for the manufacturing of a metal master. In a next step, the metal substrate ME1 is covered with a very thin layer, for example of 1-5 nm, to improve the adhesion of a photoresist and to reduce a chemical reaction between the metal substrate ME1 and the photoresist. Then the metal master ME1 is covered with a negative photoresist NP4 similar to the photoresist NP3, to obtain plate PL3e, FIG. 5e. In a further step, the photoresist NP4 of the plate PL3e is illuminated with a mastering machine to produce tracks with positive marks 7, as shown in FIG. 5f. In a further step, an eighth solvent is applied to remove the negative photoresist NP4 at non-exposed areas, to obtain tracks with positive marks 7 respectively bumps, as shown in FIG. 5g.

As a result, a metal master ME2 is obtained, plate PL3g, from which a stamper can be produced in the same way as it is done in the master-stamper replication for a "Father"—a "Mother" and a "Son" stamper. The final stamper has advantageously a small track pitch between positive marks 7 and negative marks 9, for example of 150 nm-250 nm. As the metal ME in particular nickel may be used, but other metals or alloys can be used also. The tracks' with the positive marks 7 and negative marks 9 are arranged in particular as two spirals, a first spiral comprising only positive marks 7 and a second spiral comprising only negative marks 9.

After the production of the plate PL1b, PL2b or PL3d, it may be necessary to take the plate PL1b, PL2b or PL3d out of the mastering machine to obtain the plate PL1b, PL2b or the metal substrate ME1. When the plate PL1b, PL2b or the metal substrate ME1 is put back into the mastering machine, it is essential to precisely realign the plate PL1b, PL2b or the metal substrate ME1. This may be achieved by using the pits 7 on plate PL1b or PL2b or the pits 9 generated in the metal substrate ME1: i.e. for the method shown in FIG. 5 the existing pits produce a push-pull signal that can be used to precisely align the mastering beam for producing the new marks 7 respectively bumps in the middle between the existing pits 8. Additionally a PLL based on the data signal of the pits 9 can be used to stabilize the linear velocity during the mastering of the new marks 7. This might reduce the pit length variation and therefore the related jitter contribution.

It has to be mentioned that for super-RENS ROM discs the optimum geometry can be different for positive and negative marks, respectively pits and bumps. This might depend on the exact physical phenomenon generating the super-RENS effect. Under such conditions it can be useful to optimize the depth respectively height and geometry of the positive and negative marks individually by using different thicknesses of the photo resists or the materials: NP1 and PP1, see FIG. 3 NP2 and M2, see FIG. 4, and NP3 and NP4 see FIG. 5, and/or use different writing strategies during mastering. Further, in some cases it might be advantageous to use different wavelengths for mastering the positive and negative marks.

The method as described with regard to FIG. 5 has the advantage that only negative photoresists NP3, NP4 have to be used. In principle the same photoresist can be used for photoresists NP3 and NP4. No special restrictions are needed for the two photoresists NP3 and NP4 regarding the solvability in the seventh and eighth solvents, as necessary with regard to the solvents used in the first and second method. The only restriction with regard to the seventh, respectively eighth solvent is that they should not affect the substrate 30 and the metal substrate ME1. Further, instead of Ni also other metals or metal alloys may be used.

Also other embodiments of the invention can be made by a person skilled in the art without departing from the spirit and scope of the present invention. The invention may be utilized particularly not only for read-only (ROM) optical storage media, as described in the embodiments, but also for writable and re-writable optical storage media. The methods as described before are in particular usable for a production of a Super-RENS optical disc as described with regard to FIG. 1, but may be used also for example for production of Blu-Ray type discs. The invention resides therefore in the claims herein after appended.

The invention claimed is:

1. Optical storage medium comprising a substrate layer, a data layer with a mark/space structure arranged in tracks on the substrate layer, a mask layer with a super resolution near field structure and a cover layer, wherein
    the data layer is a read-only data layer and one track comprises positive marks corresponding with bumps and a neighboring track comprises negative marks corresponding with pits,
    the tracks are arranged as spirals, and
    the mark/space structure of every second track is inverted, and one spiral comprises only positive marks and a neighboring spiral comprises only negative marks.

2. The optical storage medium of claim 1, wherein the track pitch of two neighboring tracks is below the optical resolution limit of an optical pickup usable for reading data of the optical storage medium.

3. Method for producing a master for the production of a stamper, for producing an optical storage medium comprising a data layer according to claim 1, the method comprising the following consecutive steps:
    illuminating a negative photoresist of a first plate comprising a substrate being covered by a positive photoresist, which is covered by the negative photoresist, for producing a first data structure having positive marks,
    applying a first solvent, which does not effect the positive photoresist, for removing the negative photoresist at non-exposed areas,
    illuminating the positive photoresist for producing a second data structure with negative marks, and
    applying a second solvent, which does not effect the positive marks of the remaining negative photoresist, for removing the positive photoresist at exposed areas for producing a second plate with a data structure having positive and negative marks.

4. Method in accordance with claim 3, wherein the positive and the negative marks are arranged as two spirals, the first spiral consisting of positive marks and spaces and the second spiral consisting of negative marks and spaces, and wherein the second plate is used as a master for the production of a stamper for an optical disc.

5. Method for producing a master for the production of a stamper, for producing an optical storage medium comprising a data later according to claim 1, the method comprising the following consecutive steps:
    illuminating a negative photoresist of a first plate comprising a substrate being covered with a layer of a non-photosensitive material, which is covered by the negative photoresist, for producing a first spiral with negative marks,
    applying a third solvent, which does not effect the non-photosensitive material, for removing the negative photoresist at non-exposed areas, for producing a second plate comprising a first spiral,
    coating the second plate with a positive photoresist,
    illuminating the positive photoresist with a mastering machine to produce a second spiral comprising negative marks,
    applying a fourth solvent to remove the positive photoresist at the exposed areas,
    applying an etching process with a fifth solvent to remove the parts of the material being not covered with the positive photoresist,
    and removing the remaining parts of the positive photoresist by using a sixth solvent for producing a third plate with a data structure having positive and negative marks.

6. Method in accordance with claim 5, wherein the fifth solvent does not effect the positive photoresist, wherein the sixth solvent does not effect the substrate, the material and the spiral with the positive marks, and wherein the third plate is used as a master for the production of a stamper for an optical disc.

7. Method for producing a master for the production of a stamper, for producing an optical storage medium comprising a data layer according to claim 1, the method comprising the following consecutive steps:
    illuminating a first negative photoresist of a first plate comprising a non-metal substrate being covered with the first negative photoresist for producing positive marks to obtain a second plate,
    applying a seventh solvent for removing the first negative photoresist at non-exposed areas to obtain a third plate,
    arranging a metal layer above the third plate, to obtain a fourth plate,
    removing the substrate and the remaining negative photoresist from the fourth plate, to obtain a metal substrate,
    covering the metal substrate with a second negative photoresist to obtain a fifth plate,
    illuminating the fifth plate with a mastering machine to produce positive marks,
    using an eighth solvent for removing the second negative photoresist at non-exposed areas, and
    using the remaining metal substrate as a metal master comprising tracks with positive marks and tracks with negative marks for a stamper production.

8. Method in accordance with claim 7, with the further step of coating the metal substrate, after the remaining first negative photoresist and the substrate are removed from the metal substrate and before the second negative photoresist is applied, with a layer to improve the adhesion of the second negative photoresist and to reduce a chemical reaction between the metal substrate and the second negative photoresist.

9. Method in accordance with claim 7, wherein the metal substrate consists of nickel or a nickel alloy and the non-metal substrate consists of glass, Si or SiO.sub.2, and wherein the first negative photoresist and the second negative photoresist are the same photoresist.

10. Optical storage medium comprising a substrate layer, a read-only data layer with a mark/space structure arranged in tracks on the substrate layer, and a cover layer, wherein the tracks are arranged as spirals;

the mark/space structure of every second track is inverted, and wherein one spiral comprises only positive marks and a neighboring spiral comprises only negative marks, and one track comprises positive marks (PM) corresponding with bumps and a neighboring track comprises negative marks corresponding with pits.

11. The optical storage medium of claim 10, wherein the track pitch of two neighboring tracks is below the optical resolution limit of an optical pickup usable for reading data of the optical storage medium.

* * * * *